United States Patent
Budinger et al.

(10) Patent No.: US 6,527,165 B1
(45) Date of Patent: Mar. 4, 2003

(54) METHOD OF MAKING AN ENVIRONMENTAL RESISTANT BRAZED ASSEMBLY INCLUDING A WEAR RESISTANT SURFACE PORTION

(75) Inventors: David E. Budinger, Loveland, OH (US); Todd S. Heffron, Hamilton, OH (US); John P. Heyward, Loveland, OH (US); Roger D. Wustman, Loveland, OH (US); Gregory A. White, Cincinnati, OH (US); Thomas F. Broderick, Springboro, OH (US); Joshua L. Miller, West Chester, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/535,915

(22) Filed: Mar. 24, 2000

(51) Int. Cl.$^7$ ................................................ B23K 31/12
(52) U.S. Cl. ..................................... 228/226; 228/182
(58) Field of Search ................................ 228/226, 119, 228/182, 248.1; 29/889.7, 889.1, 402.07, 402.18

(56) References Cited

U.S. PATENT DOCUMENTS

| | | | | |
|---|---|---|---|---|
| 4,269,903 A | * | 5/1981 | Clingman et al. | |
| 4,477,009 A | * | 10/1984 | Walker | |
| 5,318,406 A | * | 6/1994 | Bardes | |
| 5,364,543 A | * | 11/1994 | Bosna et al. | |
| 5,444,911 A | * | 8/1995 | Goodwater et al. | |
| 5,449,536 A | * | 9/1995 | Funkhouser et al. | |
| 6,049,978 A | * | 4/2000 | Arnold | |
| 6,086,980 A | * | 7/2000 | Foster et al. | |

\* cited by examiner

Primary Examiner—M. Alexandra Elve
Assistant Examiner—Jonathan Johnson
(74) Attorney, Agent, or Firm—Nathan D. Herkamp; Lee H. Sachs

(57) ABSTRACT

A method is provided for making, from a plurality of members brazed together, an article including an environmental resistant surface coating and a wear resistant surface portion. Prior to brazing, the members are assembled with at least one preform including the wear resistant material in a matrix including a first brazing alloy having a brazing temperature in a brazing temperature range. The assembly of members includes a second brazing alloy having a brazing temperature in the brazing temperature range. The assembly of members and wear resistant preform is heated in the brazing temperature range to provide a brazed article preform. Then the article preform is machined to a selected geometry and can be coated with the environmental coating.

9 Claims, 1 Drawing Sheet

METHOD OF MAKING AN ENVIRONMENTAL RESISTANT BRAZED ASSEMBLY INCLUDING A WEAR RESISTANT SURFACE PORTION

BACKGROUND OF THE INVENTION

This invention relates to the manufacture of a brazed assembly to a selected geometry, the assembly including an environmental resistant coating and at least one wear resistant surface portion; and, more particularly to an assembly for operation with cooperating, contacting members in a high temperature oxidizing environment.

Various components for use in power generating apparatus such as turbine engines are manufactured by joining, such as by brazing, a plurality of members into a final assembly. Examples of such components in a turbine engine include turbine nozzle segments, shrouds, shroud hangers, combustor components, and seal components, among others, some of which are coated with an environmental resistant coating. Such components cooperate closely, frequently in a sliding or rubbing relationship, with an adjacent component of the apparatus, for example a turbine nozzle and a shroud hanger. Therefore, selected surfaces of one or more of the cooperating members have been provided with a wear resistant material at an interface between members. In addition, to enable such components to be assembled to a selected, design geometry for the apparatus, sometimes called a "stack-up" limit range, such selected surfaces are shaped, such as by machining. Although such members generally are made of a high temperature alloy based on at least one of Fe, Ni, and Co, operation in a strenuous oxidizing environment has required that such members include at least an environmental resistant surface coating.

The provision of a component comprising a plurality of joined members including a wear resistant surface, an environmentally resistant coating, and an interface surface that cooperates with an adjacent component interface within a "stack-up" geometry limit has resulted in a relatively complex manufacturing sequence. For example, in the manufacture of a gas turbine engine high pressure turbine nozzle, it has been a practice first to join a plurality of members of the nozzle into an assembly by brazing, then to machine selected interface surfaces to a required geometry. An environmental resistant coating, for example a diffusion aluminide coating of a type widely used in the gas turbine engine art, is applied at an elevated temperature to the assembled and machined component. Thereafter, to prepare a selected surface, which now includes a protective coating, for a wear resistant material, the selected, coated surface is machined to remove the coating from the selected surface. This is conducted to facilitate the wear resistant material in bonding with the selected surface because it is difficult to bond the wear resistant material to a protective coating like an aluminide. A wear resistant coating then is applied such as by plasma spraying or by bonding a wear resistant preform to the surface thus prepared. The wear resistant coating is machined to a final geometry to provide an assembled geometry within the "stack-up" limit range. This relatively complex series of manufacturing steps is relatively costly and is in need of simplification while providing the same results and geometry range limits.

BRIEF SUMMARY OF THE INVENTION

The present invention, in one form, provides a method for making an article from a plurality of members brazed together, the article including an environmental resistant surface coating and a wear resistant surface portion. The method includes the steps, prior to brazing, of first assembling together a discrete wear resistant material preform including a first brazing alloy having a brazing temperature range, and the plurality of members to be brazed, with a second brazing alloy having substantially the same brazing temperature range. Then that assembly is brazed in the brazing temperature range that concurrently brazes the plurality of members and the discrete wear resistant preform to the assembly to provide an article preform. The article preform, including at least the wear resistant material, is machined to a selected geometry. Thereafter, the machined article is coated with an environmental resistant coating.

DETAILED DESCRIPTION OF THE INVENTION

Figure 1:
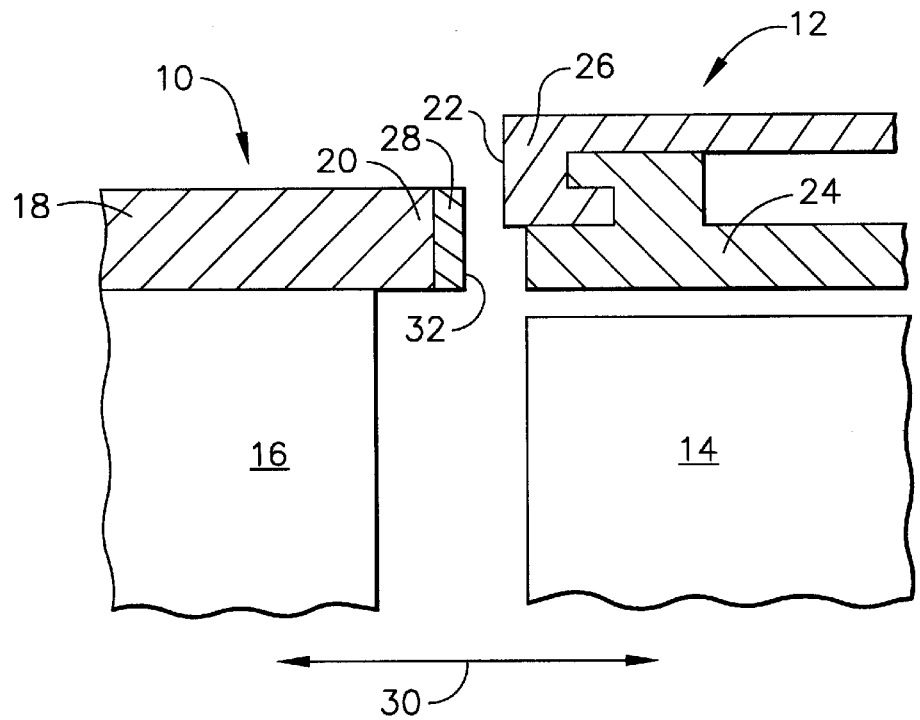
FIG. 1 is a fragmentary, sectional view of assembled components of a turbine section of a gas turbine engine.

The present invention will be more fully understood by reference to the drawing. FIG. 1 is a fragmentary, sectional view of a portion of a typical gas turbine engine turbine section assembly including a stationary turbine nozzle segment 10, a stationary shroud segment assembly 12, and a rotating turbine blade 14. Nozzle segment 10 includes as structural members a nozzle vane 16 and at least an outer band 18, an aft flange portion 20 of which is in juxtaposition with forward surface 22 of shroud hanger 26. As shown, shroud segment 12 includes shroud 24 and shroud hanger 26.

During operation of the gas turbine engine, for example when the engine is started or when the rotational speed of the engine is changed, relative motion and/or change in engine axial load can occur between aft flange portion 20 of nozzle outer band 18 and surface 22 of shroud hanger 26. To resist wear of such cooperating surfaces, a wear resistant material 28 has been applied by various methods at least to an aft surface of aft flange portion 18. In another embodiment, wear resistant material 28 has been applied to surface 22 of shroud 12. In order to maintain an engine assembly stack-up limit range, represented by dimension arrow 30, established for reasons well known in the turbine engine art, at least surface 32 of wear resistant material 28 on nozzle segment 10, or on surface 22 or both, as appropriate, is machined to a final desired geometry. After such final machining, it has been a practice to apply at least to the surface of nozzle segment 10, an environmental resistant coating, for example of the diffusion aluminide type.

A relatively complex manufacturing cycle for example for making turbine nozzle segment 10, including multiple machining steps, has been described above. An embodiment of the present invention in the manufacture of a turbine engine article reduces the machining operation to a single step conducted prior to final coating with an environmentally resistant material.

A variety of environmental resistant coatings and wear resistant materials used in turbine engines, particularly gas turbine engines, has been reported extensively in connection with such apparatus. For example, frequently, such an environmental resistant coating includes aluminum diffused at an elevated temperature into a substrate to which it has been applied, alone or in combination with other elements. One commercially available aluminide diffusion coating applied to gas turbine engine components sometimes is referred to as Codep aluminide coating, a form of which is describe in U.S. Pat. No. 3,540,878—Levine et al. (patented Nov. 17, 1970). Other forms of such coating include the commercial vapor phase aluminide process.

Wear resistant materials for use at elevated temperatures generally include one or more of such high temperature materials as carbides, nitrides, and oxides, bonded to an appropriate surface. The subject of wear resistant coatings, materials, preforms and applications to a turbine engine component is discussed in detail in copending U.S. patent application Ser. No. 09/343988—Hasz et al., filed Jun. 6, 1999.

Manufacture of one form of turbine nozzle segment 10 currently involves joining together with a brazing alloy, in a brazing temperature range, a plurality of machined structural castings. In one example, such castings include nozzle vane 16 and castings of spaced-apart nozzle bands, such as nozzle outer band 18 and an inner band. Generally for gas turbine engine applications, such members are made of a high temperature alloy based on at least one of Fe, Ni, and Co. One form of such a gas turbine engine nozzle vane segment is shown in U.S. Pat. No. 5,813,832—Rasch et al. (patented Sep. 29, 1998). Therefore, generally the assembly of segment 10 includes a nozzle inner band, not shown in the present drawing.

Figure 2:
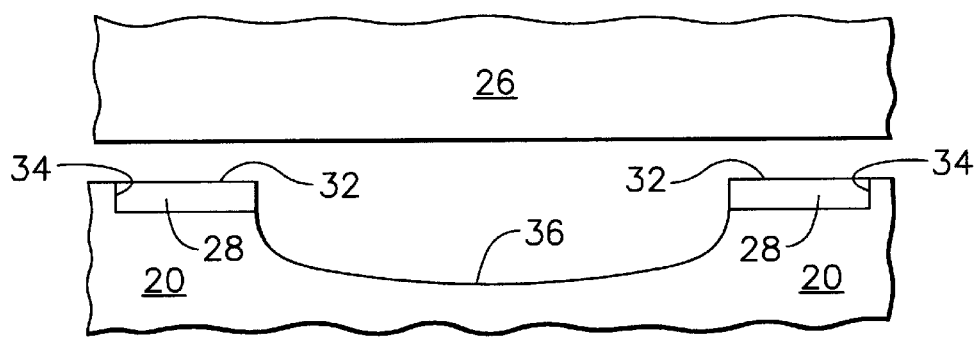
FIG. 2 is a fragmentary top view of adjacent nozzle aft flange and shroud hanger of FIG. 1.

FIG. 2 is a fragmentary top view of the assembly of FIG. 1. Wear resistant material 28 is a discrete wear resistant preform comprising a wear resistant material, for example a carbide, carried in a matrix including a brazing alloy that can be brazed in a brazing temperature range, for example a Ni base brazing alloy. Various forms of such wear resistant materials and preforms are described in detail in the above-identified copending U.S. Patent Application. Frequently, the wear resistant preform includes a non-metallic binder of a type that decomposes substantially without residue when heated in the brazing temperature range. In the embodiment of FIG. 2, each of a plurality of discrete, spaced-apart, wear resistant preforms 28 is carried in a recess 34 in aft flange portion 20. In that embodiment, a portion 36 of aft flange portion 20 has been machined in relief, as shown.

A feature of an embodiment of the present invention is that the brazing alloy used to join the structural members can be brazed in a brazing temperature range substantially the same as the brazing temperature range of the brazing alloy in the matrix of the wear resistant preform. Although such two brazing alloys can be selected to be substantially the same alloy, frequently the two brazing alloys have been different, as presented in the following specific example. In the gas turbine engine art, such brazing alloys generally are brazed in the temperature range of about 1800–2300° F.

In one specific evaluation of an embodiment of the present invention, a gas turbine engine high pressure turbine nozzle segment was made by assembling nozzle structural members including a nozzle vane with spaced-apart inner and outer nozzle bands. The vane and bands were made of a Ni base superalloy sometimes called Rene' N-5 alloy, forms of which are identified in U.S. Pat. No. 5,173,255—Ross et al. (patented Dec. 22, 1992). The vane and bands were assembled appropriately at junctures to be joined with a brazing alloy in the junctures, in a manner well known and widely used in the brazing art. The brazing alloy used sometimes is referred to as B-93 Ni base brazing alloy, forms of which are described in U.S. Pat. No. 3,700,427—Hoppin III, et al. (patented Oct. 24, 1972). The brazing alloy temperature for B-93 brazing alloy is in the range of about 2100–2230° F.

Provided for the nozzle segment in this evaluation was a pair of discrete wear resistant sheet or tape preforms, each shaped appropriately to a surface to which the preform was to be attached, such as recess 34 in FIG. 2. In other evaluations, a single preform was used, for example across the aft flange portion of outer band 18, 13DV 13167 and later machined as shown in FIG. 2. The preforms were made of a wear resistant material comprising chromium carbide in a matrix including a Ni base (Ni—Cr—Si) brazing alloy, sometimes called GE81 brazing alloy. Although this Ni base brazing alloy is different than the B-93 Ni base brazing alloy, the brazing temperature is in the same temperature range of about 2100–2230° F. As shown in the drawing, the discrete preforms 28 were secured to the aft flange portion 20 of the outer band 18 by resistance welding, sometimes called tack-welding. This provided an assembly of the structural members and the wear resistant preform.

Such assembly of the structural members of the nozzle segment and the wear resistant preform was heated in a vacuum furnace at about 2200° F. for about 5–15 minutes to braze concurrently the structural members of the vane segment and the wear resistant preform into an article preform. After cooling, the article preform was machined to a selected geometry, in this example by machining surfaces 32 of wear resistant preforms 28 and by machining relief portion 36 in aft flange portion 20 of outer band 18 to provide a nozzle segment machined article. After machining, the machined article was coated with a diffusion aluminide coating using a vapor phase aluminide process.

Forms of the present invention provide an efficient, simplified method for making an environmentally resistant brazed article assembly that includes a wear resistant portion. The method comprises first brazing, concurrently, structural members of the article and a wear resistant preform, prior to machining and coating of the assembly to provide an article preform. Then the article preform, including the wear resistant material, is machined to shape and the resulting article can be coated with an environmentally resistant coating.

The present invention has been described in connection with a variety of specific forms, shapes, embodiments, examples, methods and materials. However, it should be understood that they are intended to be typical of, rather than in any way limiting on, the scope of the present invention. Those skilled in the art will understand that the invention is capable of variations and modifications without departing from the scope of the appended claims.

What is claimed is:

1. In a method for manufacturing an article, including an environmental resistant coating, from a plurality of uncoated members assembled together with a brazing alloy at least at a juncture to be joined between the uncoated members and brazed to join the members, the article including a wear resistant material on an article surface portion, the steps of:

providing at least one discrete wear resistant preform of the wear resistant material, the preform comprising a combination of the wear resistant material and a first brazing alloy having a first brazing temperature in a brazing temperature range;

assembling together the plurality of uncoated members with a second brazing alloy having a second brazing temperature in the brazing temperature range, the second brazing alloy being disposed at least at the juncture between the members, and the wear resistant preform attached to the article surface portion, to provide an uncoated assembly;

heating the uncoated assembly at a temperature in the brazing temperature range concurrently to braze the plurality of uncoated members and the wear resistant preform into an uncoated article preform;

machining the uncoated article preform to a selected geometry to provide an uncoated machined article; and then, coating the machined article with the environmental resistant coating.

2. The method of claim 1 in which:

the members are made of a high temperature alloy based on at least one element selected from the group consisting of Fe, Ni, and Co; and, the wear resistant material is at least one material selected from the group consisting of carbides, oxides, and nitrides.

3. The method of claim 2 in which:

the members are made of a Ni base alloy;

the wear resistant material includes a carbide;

the first and second brazing alloys are Ni base brazing alloys with a brazing temperature in the range of about 1800–2300° F.; and, the environmental resistant coating includes Al.

4. The method of claim 1 for making a turbine engine component from a plurality of Ni base alloy members in which:

the wear resistant material is at least one material selected from the group consisting of carbides, oxides and nitrides;

the first and second brazing alloys are Ni base brazing alloys having a brazing temperature in the range of about 2100–2230° F.; and, the environmental resistant coating includes Al.

5. The method of claim 4 in which the turbine engine component is selected from the group consisting of turbine nozzles, turbine shrouds, turbine shroud hangers, combustors, and seals.

6. The method of claim 5 in which:

the component is a turbine nozzle made from a Ni base superalloy; and, the wear resistant material includes a carbide in a matrix including a Ni base brazing alloy.

7. The method of claim 6 in which the wear resistant preform is attached to an aft flange of the turbine nozzle.

8. The method of claim 5 in which:

the component is a turbine shroud hanger made from a Ni base superalloy; and, the wear resistant material includes a carbide in a matrix including a Ni base brazing alloy.

9. The method of claim 8 in which the wear resistant preform is attached to a forward surface of a turbine shroud hanger.

\* \* \* \* \*